US012183496B2

(12) United States Patent
Hayashii et al.

(10) Patent No.: US 12,183,496 B2
(45) Date of Patent: Dec. 31, 2024

(54) COMMON MODE CHOKE COIL

(71) Applicant: Murata Manufacturing Co., Ltd., Kyoto-fu (JP)

(72) Inventors: Ken Hayashii, Nagaokakyo (JP); Kaori Takezawa, Nagaokakyo (JP); Ryota Hashimoto, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 779 days.

(21) Appl. No.: 17/475,283

(22) Filed: Sep. 14, 2021

(65) Prior Publication Data

US 2022/0115172 A1 Apr. 14, 2022

(30) Foreign Application Priority Data

Oct. 8, 2020 (JP) ................................ 2020-170202

(51) Int. Cl.
*H01F 17/04* (2006.01)
*H01F 17/00* (2006.01)
*H01F 27/28* (2006.01)
*H01F 27/29* (2006.01)

(52) U.S. Cl.
CPC ......... *H01F 17/04* (2013.01); *H01F 27/2823* (2013.01); *H01F 27/29* (2013.01); *H01F 2017/0093* (2013.01)

(58) Field of Classification Search
CPC ...... H01F 17/04; H01F 27/2823; H01F 27/29; H01F 2017/0093
See application file for complete search history.

(56) References Cited

U.S. PATENT DOCUMENTS

2014/0097928 A1* 4/2014 Tomonari .............. H01F 17/045 336/207
2017/0169935 A1* 6/2017 Miyamoto .............. H01F 19/04
2017/0288626 A1* 10/2017 Kobayashi ............ H01F 41/069
2019/0228895 A1* 7/2019 Asai ........................ H01F 17/04
2020/0105464 A1* 4/2020 Kobayashi .............. H01F 27/24
2021/0391108 A1* 12/2021 Kunitsuka ............. H01F 27/306

FOREIGN PATENT DOCUMENTS

CN 109411212 A * 3/2019 ............ H01F 27/28
CN 110010327 A 7/2019
JP 2017-183444 A 10/2017

* cited by examiner

*Primary Examiner* — Malcolm Barnes
(74) *Attorney, Agent, or Firm* — Studebaker & Brackett PC

(57) ABSTRACT

A winding core part includes a two-layer winding region, consisting of a first layer in which a first wire is wound around the winding core part and a second layer in which a second wire is wound around the first layer, and a non-contact winding region in which the first and second wires are wound without contacting each other. The non-contact winding region located is between the first flange part and the two-layer winding region, and the two-layer winding region includes switching parts that are for switching the axial direction positional relationship between turns of the first and second wires in the two-layer winding region and are parts in which the first and second wires cross each other. In the non-contact winding region, the first wire has a longer wire length than the second wire. The first wire has a longer coil length than the second wire through both regions.

20 Claims, 13 Drawing Sheets

COMMON MODE CHOKE COIL

CROSS-REFERENCE TO RELATED APPLICATION

This application claims benefit of priority to Japanese Patent Application No. 2020-170202, filed Oct. 8, 2020, the entire content of which is incorporated herein by reference.

BACKGROUND

Technical Field

The present disclosure relates to a common mode choke coil, and in particular, relates to improvements in the way in which the wires are wound in a wound-wire-type common mode choke coil having a structure in which two wires are wound around a winding core part of a core of the common mode choke coil.

Background Art

A wound-wire-type common mode choke coil includes: a core that includes a winding core part and a first flange part and a second flange part that are provided at opposite ends of the winding core part in the axial direction of the winding core part; first and third terminal electrodes that are provided on the first flange part; second and fourth terminal electrodes that are provided on the second flange part; a first wire that is wound around the winding core part and is connected to the first terminal electrode and the second terminal electrode; and a second wire that is wound around the winding core part in the same winding direction as the first wire and is connected to the third terminal electrode and the fourth terminal electrode.

For example, a common mode choke coil that is of interest with respect to the present disclosure is disclosed in Japanese Unexamined Patent Application Publication No. 2017-183444. The common mode choke coil disclosed in Japanese Unexamined Patent Application Publication No. 2017-183444 was developed in order to improve the high-frequency characteristics, and a first winding region, a second winding region, and a third winding region, which is located between the first winding region and the second winding region, are disposed along the winding core part thereof. In the first and second winding regions, the first wire and the second wire are wound so that corresponding turns thereof are wound alongside each other in an alternating manner (referred to as "bifilar winding" in Japanese Unexamined Patent Application Publication No. 2017-183444), and in the third winding region, one out of the first wire and the second wire is wound in a first layer and the other out of the first wire and the second wire is wound in a second layer (referred to as "layer winding" Japanese Unexamined Patent Application Publication No. 2017-183444).

According to this configuration, the distances between the layer wound part and the first flange part and the second flange part are secured by the bifilar wound parts being inserted between the first and second flange parts and the layer wound part. Generally, the layer wound part will have a higher winding density than the bifilar wound parts, and therefore unwanted parasitic capacitance components are likely to be generated when the distances from the layer wound part to the first and second flange parts, which are provided with the terminal electrodes, are short. However, it is described in Japanese Unexamined Patent Application Publication No. 2017-183444 that, in the common mode choke coil having the above-described configuration, sufficient distances are secured between the layer wound portion and the first and second flange parts, and consequently, the generation of unwanted parasitic capacitance components can be suppressed, and as a result, good high-frequency characteristics can be obtained.

In Japanese Unexamined Patent Application Publication No. 2017-183444, the Sdc21 characteristic of the common mode choke coil is illustrated as a graph. Referring to this graph, improvement of the characteristic in the high frequency range of 10 MHz and higher can be seen. However, it was found that the common mode choke coil having the configuration described in Japanese Unexamined Patent Application Publication No. 2017-183444 was unable to realize a good characteristic, more specifically, was unable to reduce a mode conversion characteristic in a low-frequency range around 1 MHz.

SUMMARY

Accordingly, the present disclosure provides a common mode choke coil that can reduce a mode conversion characteristic in a low-frequency range around 1 MHz.

A way of suppressing parasitic capacitances is employed in the technology disclosed in Japanese Unexamined Patent Application Publication No. 2017-18344. For characteristics in a high-frequency range of 10 MHz and higher, capacitance components have a large effect, and therefore it is assumed that controlling parasitic capacitances in this way was effective.

On the other hand, heretofore, it has been thought that in a low-frequency range, resistance and inductance components, rather than capacitance components, are the dominant factors controlling the characteristics. In addition, due to the severe cost requirements for coils used in a low-frequency range, a complex winding method (two-layer cross winding) that takes into consideration capacitance components as described in Japanese Unexamined Patent Application Publication No. 2017-18344 has not been adopted.

Against this background, the present inventors conducted experiments and found that controlling only the resistance components and the inductance components was not sufficient in a low-frequency range around 1 MHz. After further careful research, the inventors found that it is necessary to also take capacitance components into account even in a low frequency range around 1 MHz.

A common mode choke coil according to a preferred embodiment of the present disclosure includes a core containing a magnetic material and including a winding core part that has a peripheral surface and extends in an axial direction parallel to the peripheral surface, and a first flange part and a second flange part that are respectively provided at a first end portion and a second end portion of the winding core part on opposite sides from each other in the axial direction of the winding core part. The common mode choke coil further includes a first terminal electrode and a third terminal electrode that are provided on the first flange part; a second terminal electrode and a fourth terminal electrode that are provided on the second flange part; a first wire that is wound in a helical manner around the peripheral surface of the winding core part and is connected to the first terminal electrode and the second terminal electrode; and a second wire that is wound in a helical manner around the peripheral surface of the winding core part in a direction identical to a winding direction of the first wire and is connected to the third terminal electrode and the fourth terminal electrode.

The first wire and the second wire include wire shaped central conductors composed of identical conductive materials.

In addition, the preferred embodiment of the present disclosure has the following features.

When winding regions of the first wire and the second wire around the peripheral surface of the winding core part are classified on the basis of winding states of the first wire and the second wire, there are (1) a two-layer winding region that includes a two-layer wound part consisting of a first layer in which the first wire is wound around the peripheral surface of the winding core part and a second layer in which the second wire is wound around an outside of the first layer while fitting into recesses formed between adjacent turns of the first wire, and (2) a non-contact winding region in which the first wire and the second wire are wound so as to not contact each other.

The non-contact winding region is located between the first flange part and the two-layer winding region in the axial direction of the winding core part.

The two-layer winding region includes a switching part that is for switching a positional relationship in the axial direction between turns of the first wire and the second wire in the two-layer winding region and is a part in which the first wire and the second wire cross each other.

In the non-contact winding region, a wire length of the first wire is longer than a wire length of the second wire.

Across the two-layer winding region and the non-contact winding region, a coil length of the first wire, which is a length, measured in the axial direction, of the first wire wound around the peripheral surface of the winding core part is longer than a coil length of the second wire, which is a length, measured in the axial direction, of the second wire wound around the peripheral surface of the winding core part.

According to the preferred embodiment of the present disclosure, first, the two-layer winding region includes a switching part that is for switching a positional relationship in the axial direction between turns of the first wire and the second wire and is a part in which the first wire and the second wire cross each other, and therefore capacitance components generated between the first wire and the second wire can be balanced along the entirety of the first wire and the second wire.

In addition, according to the preferred embodiment of the present disclosure, in the non-contact winding region, a wire length of the first wire is longer than a wire length of the second wire. In other words, as described above, the wire length of the first wire is longer than the wire length of the second wire in the non-contact winding region in order to compensate for the amount by which the wire length of the first wire, which forms the first layer, is inevitably shorter than the wire length of the second wire, which forms the second layer, in the two-layer winding region. Therefore, the difference between the overall wire length of the first wire and the overall wire length of the second wire is reduced, and as a result, the difference between the resistance component of the first wire and the resistance component of the second wire is reduced. Therefore, the resistance component of the first wire and the resistance component of the second wire can be balanced.

Furthermore, according to the preferred embodiment of the present disclosure, the coil length of the first wire is longer than the coil length of the second wire across the two-layer winding region and the non-contact winding region. In other words, in the two-layer winding region, the first wire forming the first layer is closer to the core containing a magnetic material than the second wire forming the second layer is and has a smaller leakage inductance, and therefore, the inductance component provided by the first wire forming the first layer is larger than the inductance component provided by the second wire forming the second layer. Since the coil length of the first wire is longer than the coil length of the second wire across the two-layer winding region and the non-contact winding region as described above in order to reduce the difference between the inductance components of the first wire and the second wire, the inductance component provided by the first wire and the inductance component provided by the second wire can be balanced.

As described above, according to the preferred embodiment of the present disclosure, a common mode choke coil can be realized in which the total impedance including the resistance components and the inductance components in addition to the capacitance components can be balanced and therefore the mode conversion characteristic in a frequency range around 1 MHz is reduced.

Other features, elements, characteristics and advantages of the present disclosure will become more apparent from the following detailed description of preferred embodiments of the present disclosure with reference to the attached drawings.

DETAILED DESCRIPTION

First Embodiment

Figure 1:
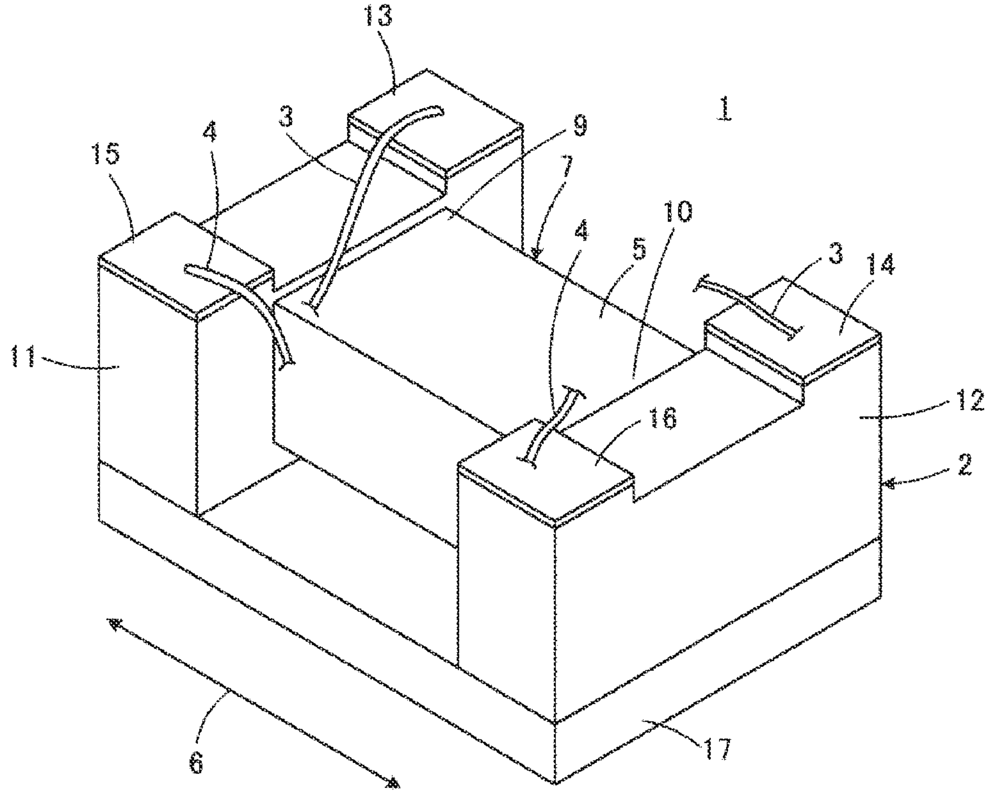
FIG. 1 is a perspective view illustrating the exterior of a common mode choke coil according to a First Embodiment of the present disclosure from the bottom surface (mounting surface) side, where illustration of parts of wires wound around a winding core part is omitted.

The exterior of a common mode choke coil 1 according to a First Embodiment of the present disclosure is illustrated in FIG. 1.

The common mode choke coil 1 includes a core 2 and a first wire 3 and a second wire 4, which form inductors. Illustration of parts of the first wire 3 and the second wire 4 is omitted from FIG. 1. The core 2 contains a magnetic material, and more specifically, is formed of a Ni—Zn ferrite as a magnetic material or a resin containing a magnetic material. The core 2 has a substantially quadrangular cross section on the whole.

The core 2 includes a winding core part 7 that has a peripheral surface 5 and extends in an axial direction 6 parallel to the peripheral surface 5, and a first flange part 11 and a second flange part 12 that are provided at a first end portion 9 and a second end portion 10 of the winding core part 7, which are on opposite sides from each other in the axial direction 6 of the winding core part 7.

A first terminal electrode 13 and a third terminal electrode 15 are provided on the first flange part 11 and a second terminal electrode 14 and a fourth terminal electrode 16 are provided on the second flange part 12. The terminal electrodes 13 to 16 are formed, for example, by baking a conductive paste or plating a conductive metal. The terminal electrodes 13 to 16 may be replaced with terminal members composed of metal plates. As can be seen from the positions of the terminal electrodes 13 to 16, FIG. 1 illustrates the common mode choke coil 1 in an orientation where the surface that would face the mounting substrate is facing upward, i.e., is illustrated from the bottom side.

The common mode choke coil 1 may further include a top plate 17. Similarly to the core 2, the top plate 17 contains a magnetic material, and more specifically, is formed of a Ni—Zn ferrite as a magnetic material or a resin containing a magnetic material. When the core 2 and the top plate 17 contain a magnetic material, the top plate 17 is provided so as to connect the first flange part 11 and the second flange part 12 to each other and the core 2 forms a closed magnetic circuit together with the top plate 17. Instead of the top plate 17, a coating composed of a resin containing a magnetic material may be applied.

If these is no particular desire to provide a function of forming a closed magnetic circuit as described above, the top plate 17 or the resin coating may be composed of a material that does not contain a magnetic material.

Detailed illustration of the first wire 3 and the second wire 4 is omitted, but ordinarily, the first wire 3 and the second wire 4 will each include a substantially wire-shaped central conductor composed of an electrically conductive material and an electrical insulating coating that covers the peripheral surface of the wire-shaped central conductor. For example, the wires 3 and 4 are composed of insulator-coated copper wires. The substantially wire-shaped central conductors of the first wire 3 and the second wire 4 are composed of the same conductive material and have substantially the same electrical resistance per unit length as each other. In a typical example, if the first wire 3 and the second wire 4 are composed of the same conductive material as each other, the first wire 3 and the second wire 4 will have substantially the same wire diameter as each other. The reason why it is stated that the first wire 3 and the second wire 4 have substantially the same electrical resistance is that there may be some differences in terms of the composition and wire diameter of the central conductors due to the effect of processing effects and so on and such differences are permitted.

In FIG. 1, only the end portions of the first wire 3 and the second wire 4 are illustrated. The two end portions of the first wire 3 are respectively connected to the first terminal electrode 13 and the second terminal electrode 14 and the two end portions of the second wire 4 are respectively connected to the third terminal electrode 15 and the fourth terminal electrode 16. For example, thermal pressure bonding is used to form these connections.

Figure 2:
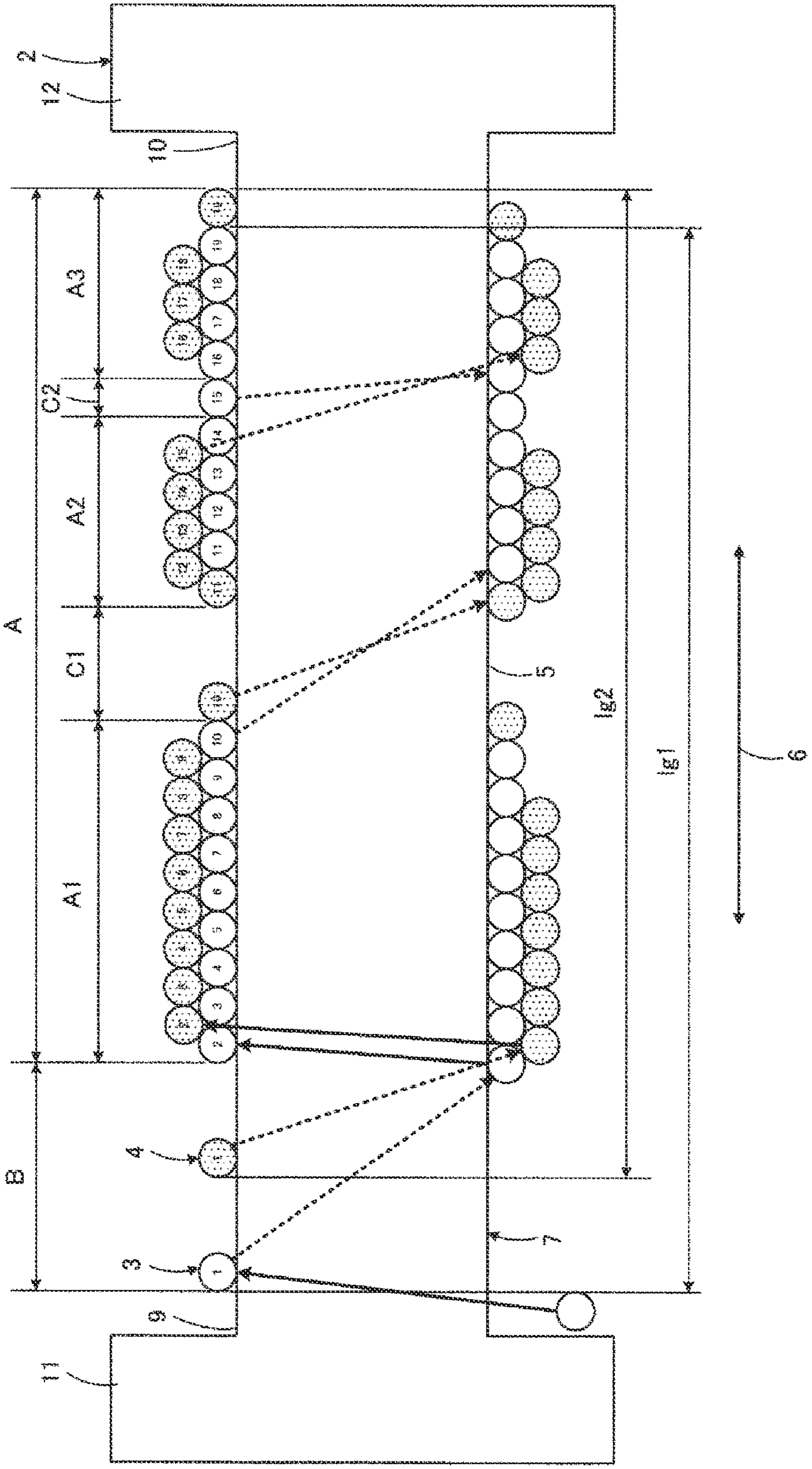
FIG. 2 schematically illustrates the winding states of a first wire and a second wire in the common mode choke coil illustrated in FIG. 1, with a plane through which the center axis of the winding core passes and that is perpendicular to the mounting surface being at the front in FIG. 2, and the core and the first and second wires are illustrated in a cross-sectional view.
Figure 3:
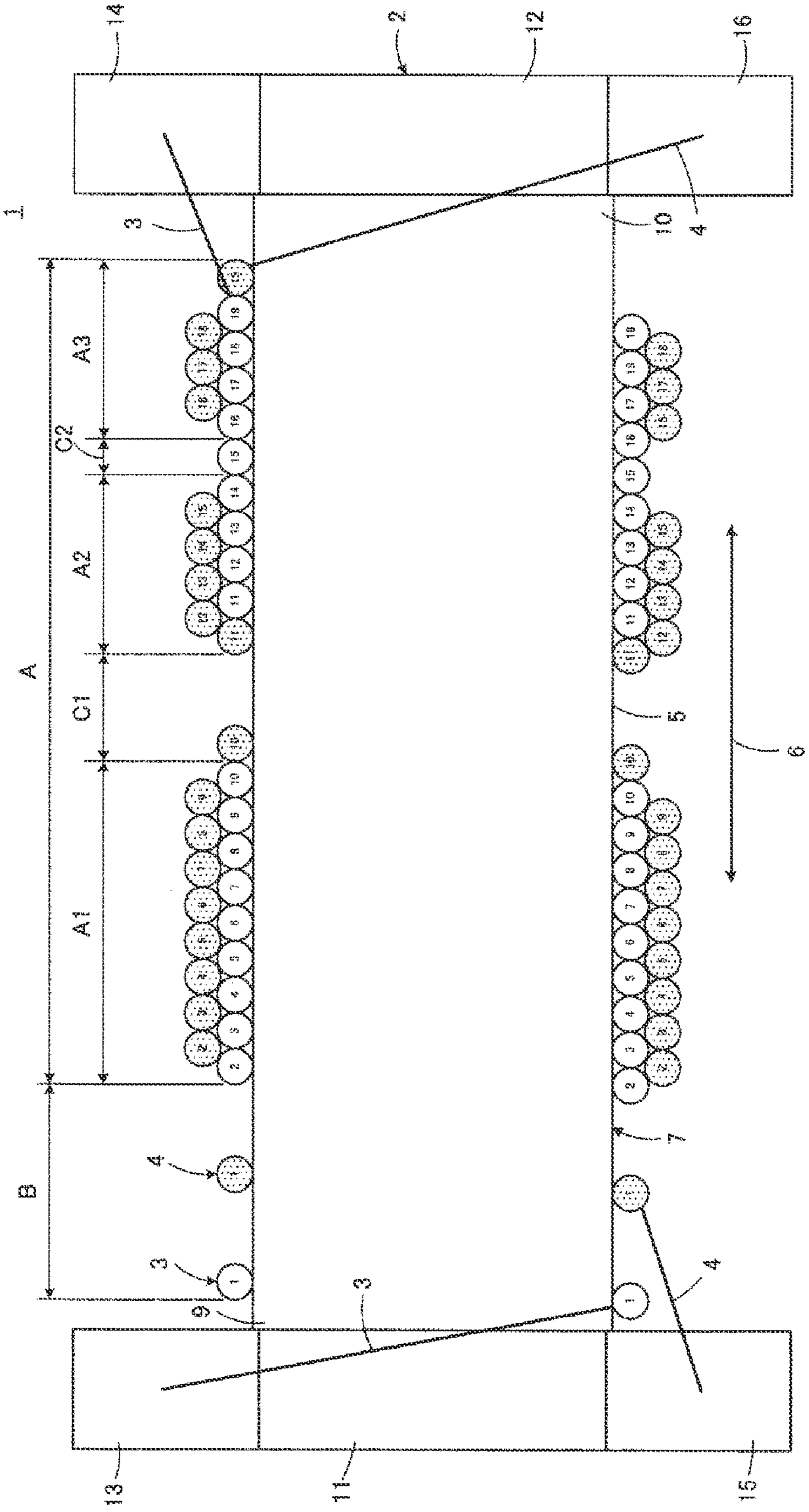
FIG. 3 schematically illustrates the winding states of the first wire and the second wire in the common mode choke coil illustrated in FIG. 1 from the bottom surface side, and the winding core part, except for flange parts, of the core are illustrated in a cross-sectional view.

The winding states of the first wire 3 and the second wire 4 around the winding core part 7 in the common mode choke coil 1 illustrated in FIG. 1 are illustrated in schematic sectional views in FIGS. 2 and 3. Here, in FIG. 2, the winding states of the first wire 3 and the second wire 4 around the winding core part 7 are illustrated with a plane through which the center axis of the winding core part 7 passes and that is perpendicular to the mounting surface being at the front in FIG. 2, and in FIG. 3 the winding states of the first wire 3 and the second wire 4 around the winding core part 7 are illustrated from the side near the bottom surface (mounting surface). In FIGS. 2 and 3 and subsequent similar sectional views, the cross section of the second wire 4 is shaded so as to be clearly distinguishable from the first wire 3.

Although not illustrated in FIG. 1, the first wire 3 and the second wire 4 are wound in a helical manner around the peripheral surface 5 of the winding core part 7 from the first end portion 9 on the side near the first flange part 11 to the second end portion 10 on the side near the second flange part 12 so as to have substantially the same number of turns, as illustrated in FIGS. 2 and 3. Numbers "1" to "19" indicating what number turn a particular turn is counting from the side near the first end portion 9 of the winding core part 7 (hereafter, referred to as "ordinal turn numbers") are written inside the cross-sections of the first wire 3 and the second wire 4 illustrated in FIGS. 2 and 3. The ordinal turn numbers are written inside the cross sections of the first wire 3 and the second wire 4 in other similar sectional views as well.

Solid line arrows and dotted line arrows are illustrated in FIG. 2. The solid line arrows and the dotted line arrows schematically illustrate characteristic parts of the first wire 3 and the second wire 4 wound around the winding core part 7, and parts located on the front side of the winding core part 7 are illustrated using the solid line arrows and parts that are hidden on the opposite side of the winding core part 7 are illustrated using the dotted line arrows.

In addition, FIG. 3 illustrates a state in which one end of the first wire 3 is connected to the first terminal electrode 13 and the other end of the first wire 3 is connected to the second terminal electrode 14 and a state in which one end of the second wire 4 is connected to the third terminal electrode 15 and the other end of the second wire 4 is connected to the fourth terminal electrode 16.

As illustrated in FIGS. 2 and 3, when the winding regions of the first wire 3 and the second wire 4 around the peripheral surface 5 of the winding core part 7 are classified on the basis of the winding states of the first wire 3 and the second wire 4, there are (1) a two-layer winding region A that includes a two-layer wound part consisting of a first layer in which the first wire 3 is wound around the peripheral surface 5 of the winding core part 7 and a second layer in which the second wire 4 is wound around the outside of the first layer while fitting into recesses formed between adjacent turns of the first wire 3, and (2) a non-contact winding region B in which the first wire 3 and the second wire 4 are wound so as to not contact each other.

In this embodiment, one non-contact winding region B is positioned between the first flange part 11 and the two-layer winding region A in the axial direction 6 of the winding core part 7.

Focusing on the two-layer winding region A, the two-layer winding region A is provided with two switching parts C1 and C2 that are for switching the positional relationship in the axial direction 6 between the turns of the first wire 3 and the second wire 4 by allowing the first wire 3 and the second wire 4 to cross each other. "Switching the positional relationship in the axial direction 6 between the turns of the first wire 3 and the second wire 4" means, for example, with respect to the positional relationship between the nth turn of the first wire 3 and the nth turn of the second wire 4, changing from a state in which the nth turn of the first wire 3 is positioned nearer the first flange part 11 than the nth turn of the second wire 4 to a state in which the nth turn of the second wire 4 is positioned nearer the first flange part 11 than the nth turn of the first wire 3. Capacitance components generated between the first wire 3 and the second wire 4 can be balanced along the entirety of the first wire 3 and the second wire 4 by switching the positional relationship in the axial direction 6 between the turns of the first wire 3 and the second wire 4. This point will be described in more detail later while referring to FIGS. 4 and 5.

Among the two switching parts C1 and C2, in the switching part C1, gaps are provided between the turns of the wires 3 and 4 before and after the place where the first wire 3 and the second wire 4 cross each other, whereas gaps are not provided in the switching part C2.

Furthermore, in the non-contact winding region B, the wire length of the first wire 3 is longer than the wire length of the second wire 4.

In addition, across the two-layer winding region A and the non-contact winding region B, a coil length lg1 of the first wire 3 is longer than a coil length lg2 of the second wire 4.

The way in which capacitance components generated between the first wire 3 and the second wire 4 are affected by switching the positional relationship in the axial direction 6 between the turns of the first wire 3 and the second wire 4 will be described while referring to FIGS. 4 and 5.

Figure 4:
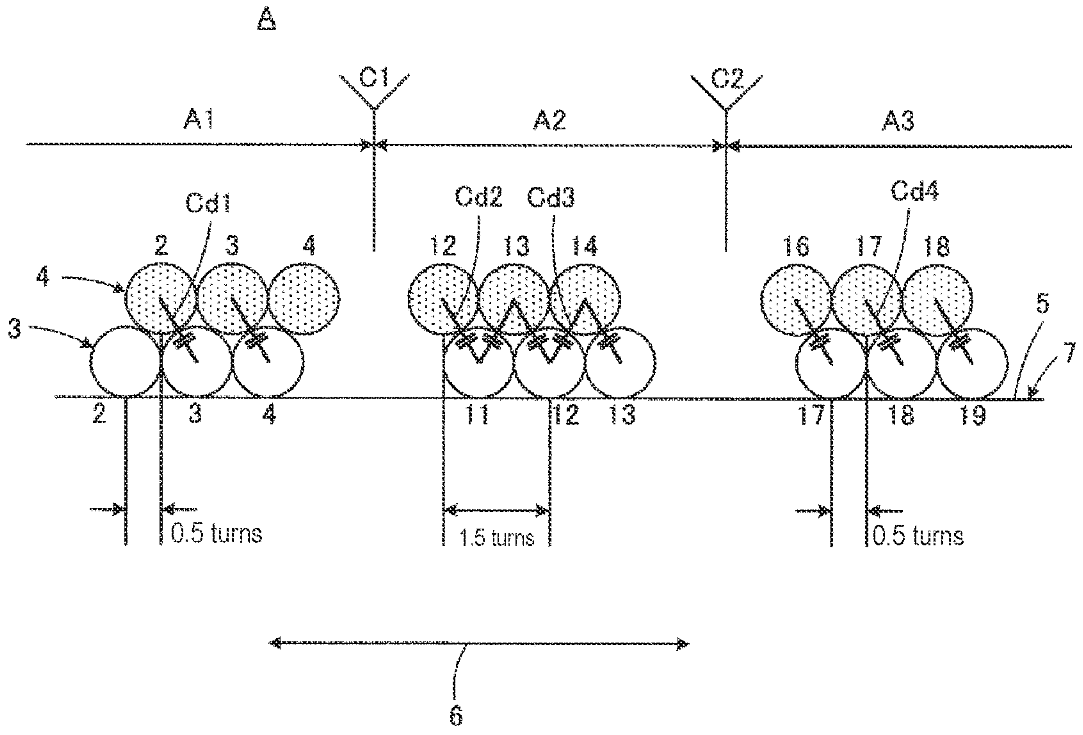
FIG. 4 is a sectional view for describing diagonal capacitances generated between the first wire and the second wire illustrated in FIG. 2.

FIG. 4 illustrates an enlarged sectional view of parts of the winding states of the first wire 3 and the second wire 4 in three regions obtained by dividing the two-layer winding region A using the two switching parts C1 and C2, that is, a first region A1, a second region A2, and a third region A3. In FIG. 4, numbers written near the cross sections of the first wire 3 and the second wire 4 indicate ordinal turn numbers corresponding to the ordinal turn numbers illustrated in FIGS. 2 and 3.

Figure 5:
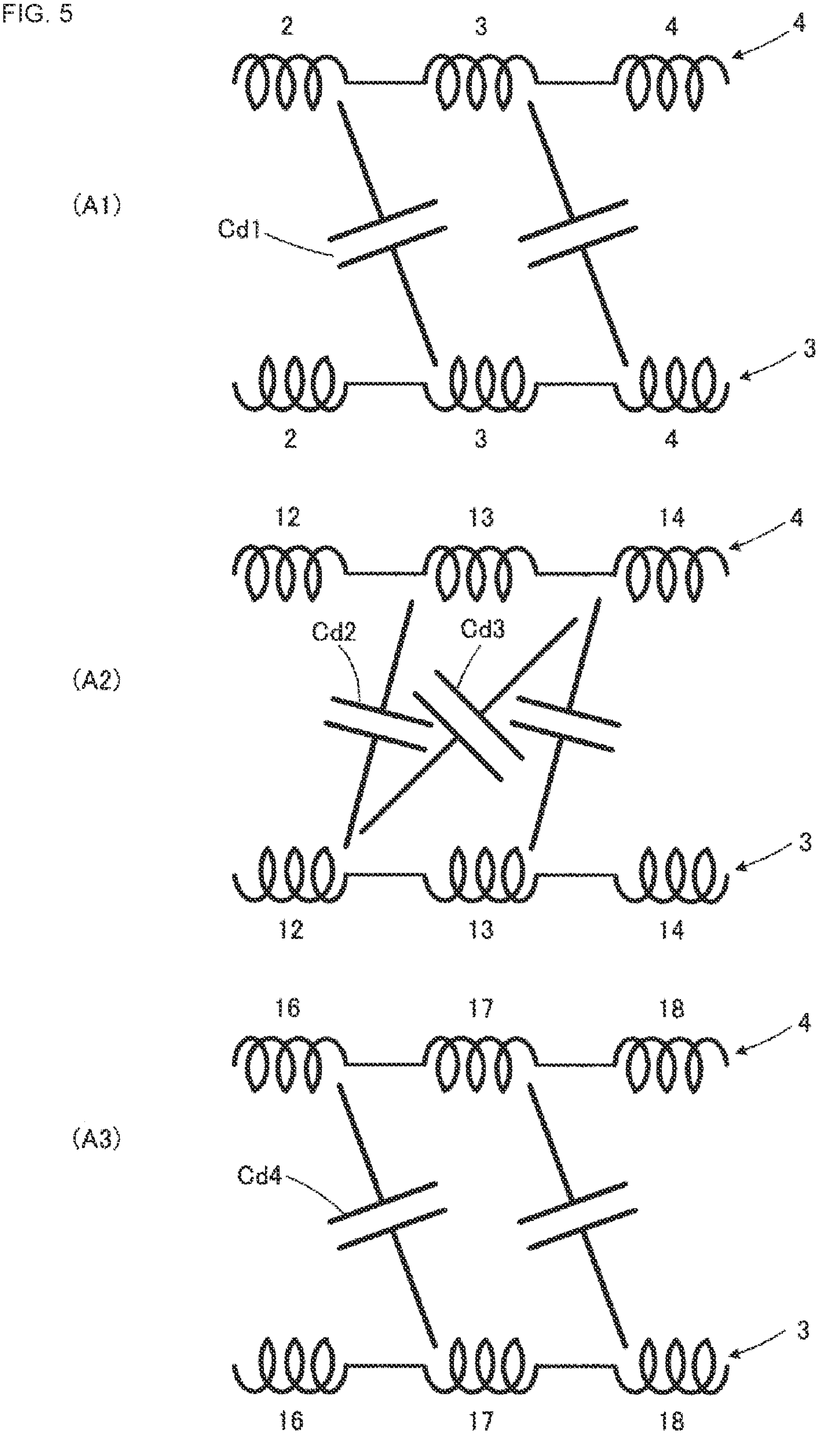
FIG. 5 is an equivalent circuit diagram for describing in more detail the diagonal capacitances generated between the first wire and the second wire illustrated in FIG. 4.

Furthermore, in FIG. 5, in the first region A1, the second region A2, and the third region A3, one turn of each of the first wire 3 and the second wire 4 illustrated in FIG. 4 is represented using one inductor symbol and the numbers written near the inductor symbols indicate ordinal turn numbers corresponding to the ordinal turn numbers illustrated in FIGS. 2 and 3. In FIG. 5, turns having the same ordinal turn number of the first wire 3 and the second wire 4 are illustrated as being vertically aligned.

A cause of an increase in the mode conversion characteristic, which is the Scd21 characteristic representing conversion of differential signals input to the common mode choke coil into common mode signals, is that stray capacitances (distributed capacitances) generated in association with the common mode choke coil cause the balance of signals passing through the common mode choke coil to be disrupted. The inventors of the present disclosure discovered that stray capacitances between turns of the first wire 3 and the second wire 4 having different ordinal turn numbers (hereafter, "diagonal capacitances"), among stray capacitances generated between the adjacent first wire 3 and second wire 4, have a pronounced effect as a factor that particularly causes Scd21 to increase. In FIGS. 4 and 5, diagonal capacitances Cd1, Cd2, Cd3, and Cd4 are illustrated.

As illustrated in FIG. 4, in the first region A1 of the two-layer winding region A, a turn of the first wire 3 having a certain ordinal turn number and a turn of the second wire 4 having the same ordinal turn number are 0.5 turns apart from each other in the axial direction 6 of the winding core part 7.

Therefore, in the first region A1, the diagonal capacitances Cd1 is formed between an (n+1)th turn of the first wire 3 and an nth turn of the second wire 4, for example, between the third turn of the first wire 3 and the second turn of the second wire 4. Therefore, the diagonal capacitance Cd1 has a so-called "down and to the right" connection posture in the equivalent circuit diagram of FIG. 5 in which turns of the first wire 3 and the second wire 4 having the same ordinal turn number are illustrated as being vertically aligned. Note that the expression "down and to the right" or "up and to the right" will be also used in later descriptions.

Next, in the second region A2, a turn of the first wire 3 having a certain ordinal turn number and a turn of the second wire 4 having the same ordinal turn number are 1.5 turns apart in the axial direction 6 of the winding core part 7, as illustrated in FIG. 4.

Therefore, in the second region A2, first, the diagonal capacitance Cd2 is formed between an nth turn of the first wire 3 and an (n+1)th turn of the second wire 4, for example, between the eleventh turn of the first wire 3 and the twelfth turn of the second wire 4. Therefore, the diagonal capacitance Cd2 has a so-called "up and to the right" connection posture in the equivalent circuit diagram of FIG. 5 in which turns of the first wire 3 and the second wire 4 having the same ordinal turn number are illustrated as being vertically aligned.

In the second region A2, in addition, the diagonal capacitance Cd3 is formed between an nth turn of the first wire 3 and an (n+2)th turn of the second wire 4, for example, between the eleventh turn of the first wire 3 and the thirteenth turn of the second wire 4. Therefore, the diagonal capacitance Cd3 has a so-called "up and to the right" connection posture in the equivalent circuit diagram of FIG. 5 in which turns of the first wire 3 and the second wire 4 having the same ordinal turn number are illustrated as being vertically aligned.

Next, in the third region A3, a turn of the first wire 3 having a certain ordinal turn number and a turn of the second wire 4 having the same ordinal turn number are 0.5 turns apart in the axial direction 6 of the winding core part 7, as illustrated in FIG. 4.

Therefore, in the third region A3, the diagonal capacitance Cd4 is formed between an (n+1)th turn of the first wire 3 and an nth turn of the second wire 4, for example, between the seventeenth turn of the first wire 3 and the sixteenth turn of the second wire 4. Therefore, similarly to the diagonal capacitance Cd1, the diagonal capacitance Cd4 has a so-called "down and to the right" connection posture in the equivalent circuit diagram of FIG. 5 in which turns of the first wire 3 and the second wire 4 having the same ordinal turn number are illustrated as being vertically aligned.

Next, the diagonal capacitances Cd, Cd2, Cd3, and Cd4 described above will be quantified and the magnitudes and effects thereof will be discussed.

In the case where a diagonal capacitance has a "down and to the right" connection posture such as the diagonal capacitance Cd1 in the first region A1 or the diagonal capacitance Cd4 in the third region A3 illustrated in FIG. 5, a "+" sign will be added to quantify the diagonal capacitance. Conversely, in the case where a diagonal capacitance has a "up and to the right" connection posture such as the diagonal capacitance Cd2 or Cd3 in the second region A2 illustrated in FIG. 5, a "−" sign will be added to quantify the diagonal capacitance.

In addition, when the difference between the ordinal turn number on the first wire 3 side and the ordinal turn number on the second wire 4 side between which the diagonal capacitance is generated is "1" as in the case of the diagonal capacitances Cd1, Cd2, and Cd4, the absolute value of the diagonal capacitance is quantified as "1". In addition, when the difference between the ordinal turn number on the first wire 3 side and the ordinal turn number on the second wire 4 side between which the diagonal capacitance is generated is "2" as in the case of the diagonal capacitance Cd3, the absolute value of the diagonal capacitance is quantified as "2".

Following the above-described rules, the diagonal capacitances Cd1 and Cd4 can be quantified as "+1". The diagonal capacitance Cd2 can be quantified as "−1". The diagonal capacitance Cd3 can be quantified as "−2". Therefore, for example, in the second region A2, a diagonal capacitance of $(-1)+(-2)=-3$ is generated for each one turn of the second wire 4.

An overall diagonal capacitance of $+1\times N1$ is generated in the first region A1, an overall diagonal capacitance of $-3\times N2$ is generated in the second region A2, and an overall diagonal capacitance of $+1\times N3$ is generated in the third region A3, where N1 is the number of turns of the second wire 4 located in the first region A1 and forming the second layer, N2 is the number of turns of the second wire 4 located in the second region A2 and forming the second layer, and N3 is the number of turns of the second wire 4 located in the third region A3 and forming the second layer.

Therefore, if the sum of the number of turns N1 and the number of turns N3 is three times the number of turns N2, i.e., $N1+N3=N2\times 3$, then $(+1\times N1)+(+1\times N3)=-3\times N2$. In this case, the diagonal capacitances generated in the entire first region A1 and the entire third region A3 are canceled out by the diagonal capacitances generated in the entire second region A2, and as a result, diagonal capacitances generated between the first wire 3 and the second wire 4 in the two-layer winding region A can be balanced across the entirety of the first wire 3 and second wire 4. Therefore, the effect of diagonal capacitances generated between the first wire 3 and the second wire 4 can be reduced and the mode conversion characteristic of the common mode choke coil 1 can be reduced.

Note that, in reality, stray capacitances that affect the mode conversion characteristic may include, in addition to the diagonal capacitances generated between the first wire 3 and the second wire 4 described above, stray capacitances generated between the first wire 3 and the second wire 4 in the switching parts C1 and C2, stray capacitances generated between the wires 3 and 4 and the terminal electrodes 13 to 16 (In this embodiment, since the first terminal electrode 13 and the third terminal electrode 15 are relatively far from the two-layer winding region A, the stray capacitances in these places can be almost negligible), and stray capacitances generated between wiring lines on the mounting substrate and a reference ground plane when the common mode choke coil 1 is mounted. Therefore, considering these stray capacitances and so forth and additionally considering the fact that there may be cases where the total number of turns of the second wire 4 located in the two-layer winding region A and forming the second layer is not divisible into a ratio of 1:3, the sum of the above-mentioned number of turns N1 and number of turns N3 is not limited to being exactly three times the number of turns N2, and preferably, so long as the sum of the number of turns N1 and N3 is from two to five times the number of turns N2, this would be acceptable.

In relation to this, in the embodiment illustrated in FIGS. 2 and 3, the number of turns N1 of the second wire 4 located in the first region A1 and forming the second layer is 8, the number of turns N2 of the second wire 4 located in the second region A2 and forming the second layer is 4, and the number of turns N3 of the second wire 4 located in the third region A3 and forming the second layer is 3. Thus, $N1+N3=11$ while $N2\times 3=12$, and therefore $N1+N3$ is approximately $N2\times 3$, but not exactly $N2\times 3$. However, $N1+N3$ is acceptable since it lies within the range given by $N2\times 2\leq N1+N3\leq N2\times 5$.

Next, the feature of the wire length of the first wire 3 being longer than the wire length of the second wire 4 in the non-contact winding region B will be explained.

In the above-described two-layer winding region A, the winding diameter of the first wire 3 forming the first layer is shorter than the winding diameter of the second wire 4 forming the second layer, and therefore the wire length of the first wire 3 forming the first layer is inevitably shorter than the wire length of the second wire 4 forming the second layer. Therefore, since the first wire 3 and the second wire 4 include wire-shaped central conductors composed of the same conductive material as each other and have substantially the same electrical resistance per unit length as each other as described above, the resistance component of the first wire 3 is smaller than the resistance component of the second wire 4 in the two-layer winding region A.

The wire length of the first wire 3 is longer than the wire length of the second wire 4 in the non-contact winding region B in order to compensate for the amount by which the wire length of the first wire 3, which forms the first layer, is shorter than the wire length of the second wire 4, which forms the second layer, in the two-layer winding region A. As a result, the resistance component of the first wire 3 is larger than the resistance component of the second wire 4 in the non-contact winding region B in order to compensate for the amount by which the resistance component of the first wire 3 is smaller than the resistance component of the second wire 4 in the two-layer winding region A.

As described above, the difference between the overall wire length of the first wire 3 and the overall wire length of the second wire 4 is reduced, and as a result, the difference between the resistance component of the first wire 3 and the resistance component of the second wire 4 is reduced. Therefore, the resistance component of the first wire 3 and the resistance component of the second wire 4 can be balanced. Ideally, the wire length of the first wire 3 and the wire length of the second wire 4 are identical across the two-layer winding region A and the non-contact winding region B.

Since the first wire 3 and the second wire 4 are wound around the winding core part 7 so as to not contact each other in the non-contact winding region B, it is possible to ignore the generation of substantial stray capacitances.

In addition, the feature that the coil length lg1 of the first wire 3 is longer than the coil length lg2 of the second wire 4, as illustrated in FIG. 2, across the two-layer winding region A and the non-contact winding region B will be explained.

Generally, an inductance value L of a coil is given by the following formula.

$$L=\kappa\mu SN^2/lg$$

Here, κ is the Nagaoka coefficient, μ is the magnetic permeability, S is the cross-sectional area of the coil, N is the number of turns of the coil, and lg is the coil length.

In the two-layer winding region A, the first wire 3 forming the first layer is closer to the core 2 containing a magnetic material than the second wire 4 forming the second layer is and has a smaller leakage inductance. Therefore, the inductance value L provided by the first wire 3 forming the first layer is larger than the inductance value L provided by the second wire 4 forming the second layer. The coil length lg1 of the first wire 3 is longer than the coil length lg2 of the second wire across the two-layer winding region A and the non-contact winding region B as described above in order to reduce the difference between the inductance components of the first wire 3 and the second wire 4 in the two-layer winding region A.

As a result, the inductance component provided by the first wire 3 and the inductance component provided by the second wire 4 can be balanced.

The above-described inductance components can be more effectively balanced if the endmost turn of the first wire 3 is nearer the first flange part 11 than the endmost turn of the second wire 4 is for the respective endmost turns of the first wire 3 and the second wire 4 located on the side near the first flange part 11 in the non-contact winding region B, as in this embodiment.

In this embodiment, as illustrated in FIGS. 2 and 3, in the two-layer winding region A, the second wire 4, which is to be wound so as to form the second layer, is wound so as to contact the peripheral surface 5 of the winding core part 7 in parts of the two-layer winding region A. More specifically, the tenth turn and the eleventh turn of the second wire 4 in the switching part C1 and the final turn, i.e., the nineteenth turn, of the second wire 4 on the side near second end portion 10 of the winding core part 7 are wound so as to contact the peripheral surface 5 of the winding core part 7.

When some of the turns of the second wire 4 are wound so as to contact the peripheral surface 5 of the winding core part 7 in this way, the distance between the second wire 4 and the core 2 is shorter and the leakage inductance can be reduced. The may contribute to adjusting the inductance components.

As described above, according to the common mode choke coil 1 of this embodiment, the total impedance including the resistance components and the inductance components in addition to the capacitance components can be balanced and therefore the mode conversion characteristic in a frequency range around 1 MHz can be effectively reduced.

Figure 6:
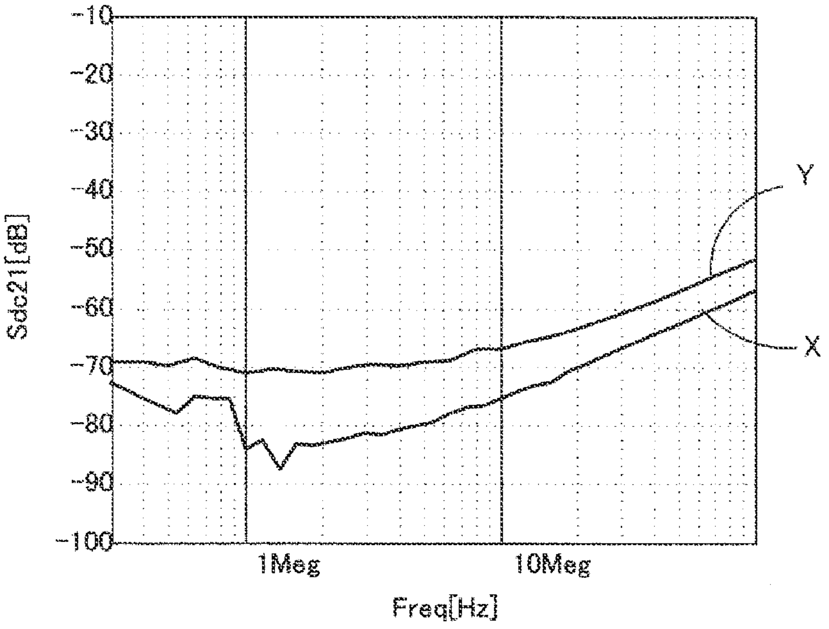
FIG. 6 illustrates mode conversion characteristics (Sdc21) of common mode choke coils obtained by simulation, where X represents the mode conversion characteristic of the common mode choke coil illustrated in FIG. 2 and Y represents the mode conversion characteristic of a common mode choke coil according to a comparative example.

Mode conversion characteristics (Sdc21) obtained by simulation are illustrated in FIG. 6. In FIG. 6, X is the mode conversion characteristic of the common mode choke coil 1 according to the First Embodiment and Y is the mode conversion characteristic of the common mode choke coil according to a comparative example.

Figure 7:
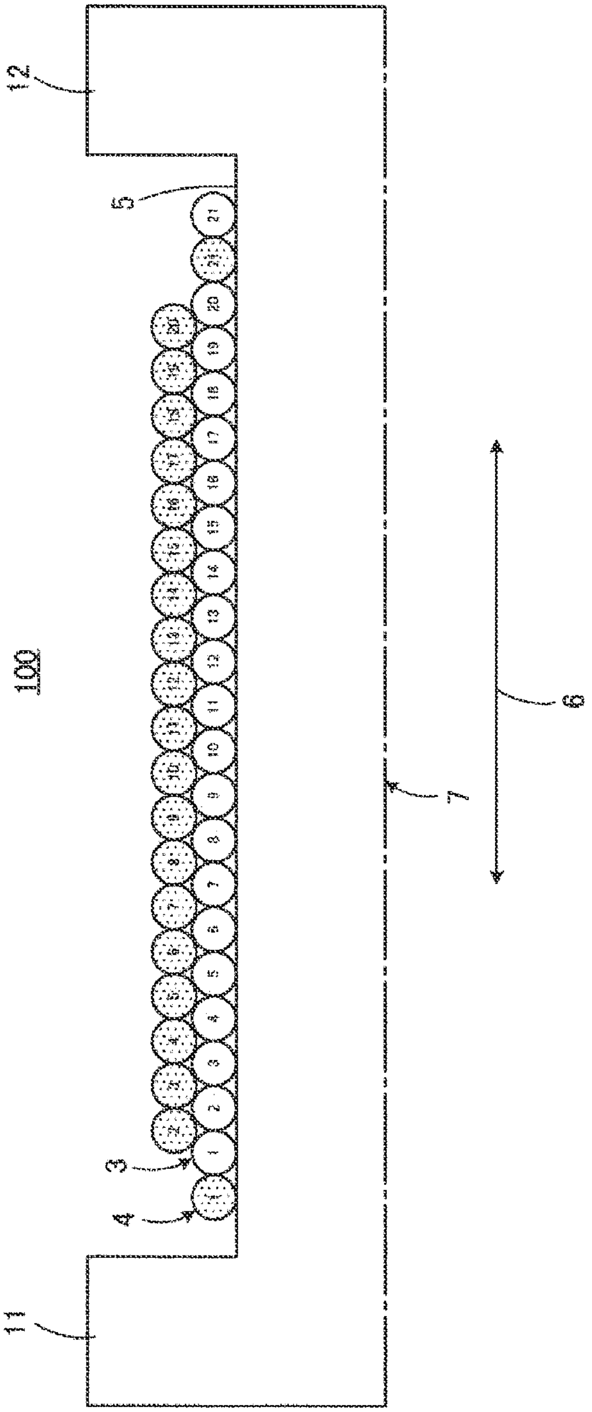
FIG. 7 is a diagram corresponding to the upper half of FIG. 2 and schematically illustrates the winding states of a first wire and a second wire of the common mode choke coil according to the comparative example whose mode conversion characteristic is illustrated in FIG. 6.

As illustrated in FIG. 7, a common mode choke coil 100 according to the comparative example has a two-layer winding structure in which the first wire 3 is wound so as to form the first layer in contact with the peripheral surface 5 of the winding core part 7 and the second wire 4 is wound so as to form the second layer located outside the first layer formed of the first wire 3. In the common mode choke coil 100, there are no switching parts for switching the positional relationship in the axial direction 6 between the turns of the first wire 3 and the second wire 4 and there are also no parts where the first wire 3 and the second wire 4 are wound so as to not contact each other. In the common mode choke coil 100, the coil length of the first wire 3 and the coil length of the second wire 4 are identical.

Referring to FIG. 6, it can be seen that the mode conversion characteristic around 1 MHz is improved in the mode conversion characteristic X of the common mode choke coil 1 of the First Embodiment compared to the common mode choke coil 100 of the comparative example.

Second Embodiment

The Second Embodiment differs from the First Embodiment in that there is one switching part C in the Second Embodiment that is for switching the positional relationship in the axial direction 6 between the turns of the first wire 3 and the second wire 4 in the two-layer winding region A.

Figure 8:
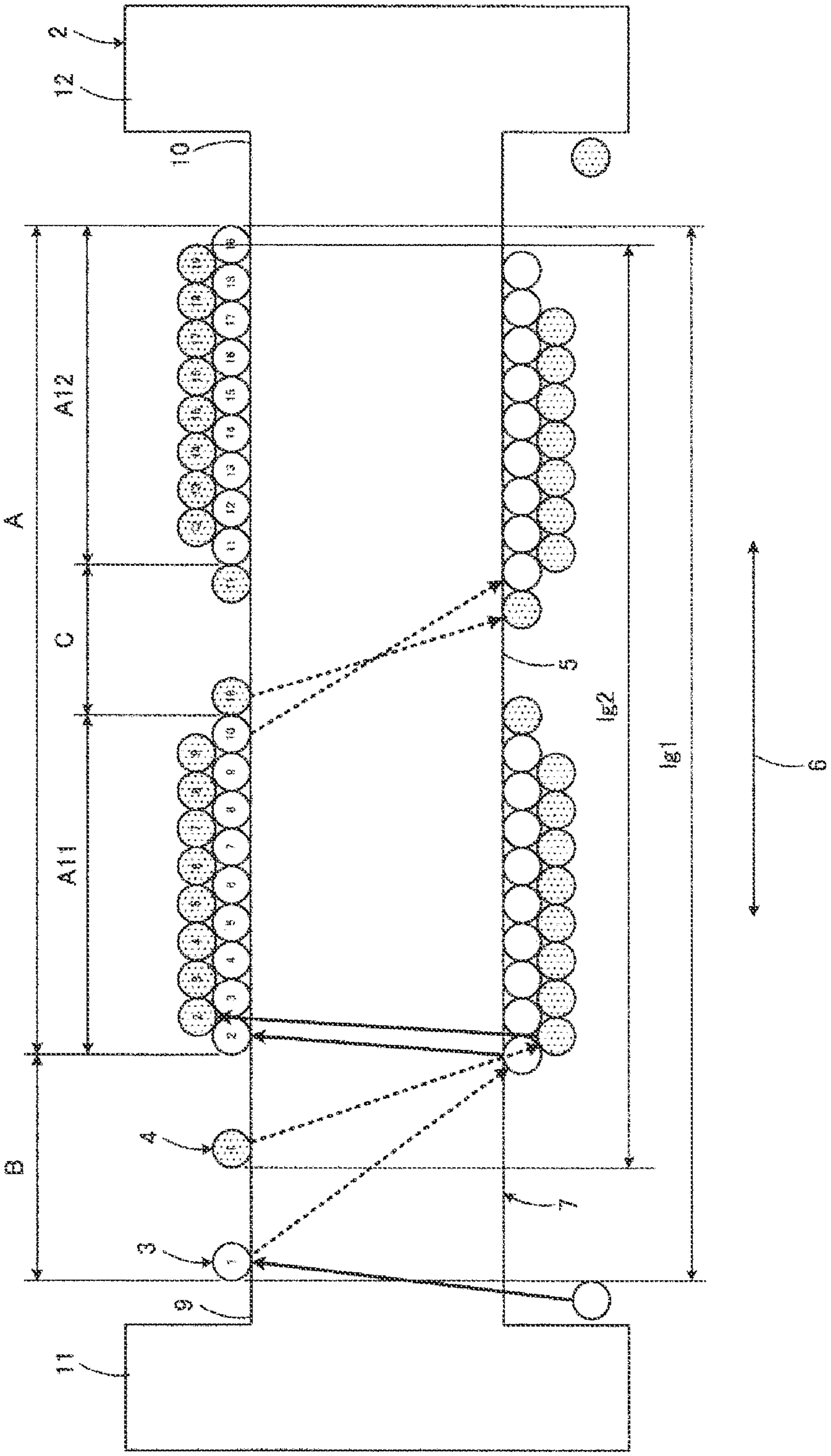
FIG. 8 is a diagram corresponding to FIG. 2 and schematically illustrates the winding states of a first wire and a second wire of a common mode choke coil according to a Second Embodiment of the present disclosure.
Figure 9:
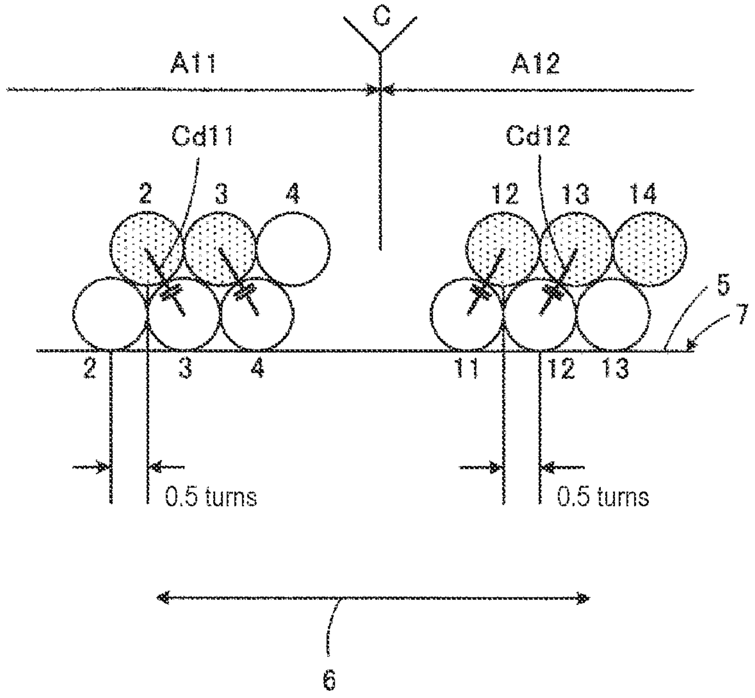
FIG. 9 is a sectional view for describing diagonal capacitances generated between the first wire and the second wire illustrated in FIG. 8.
Figure 10:
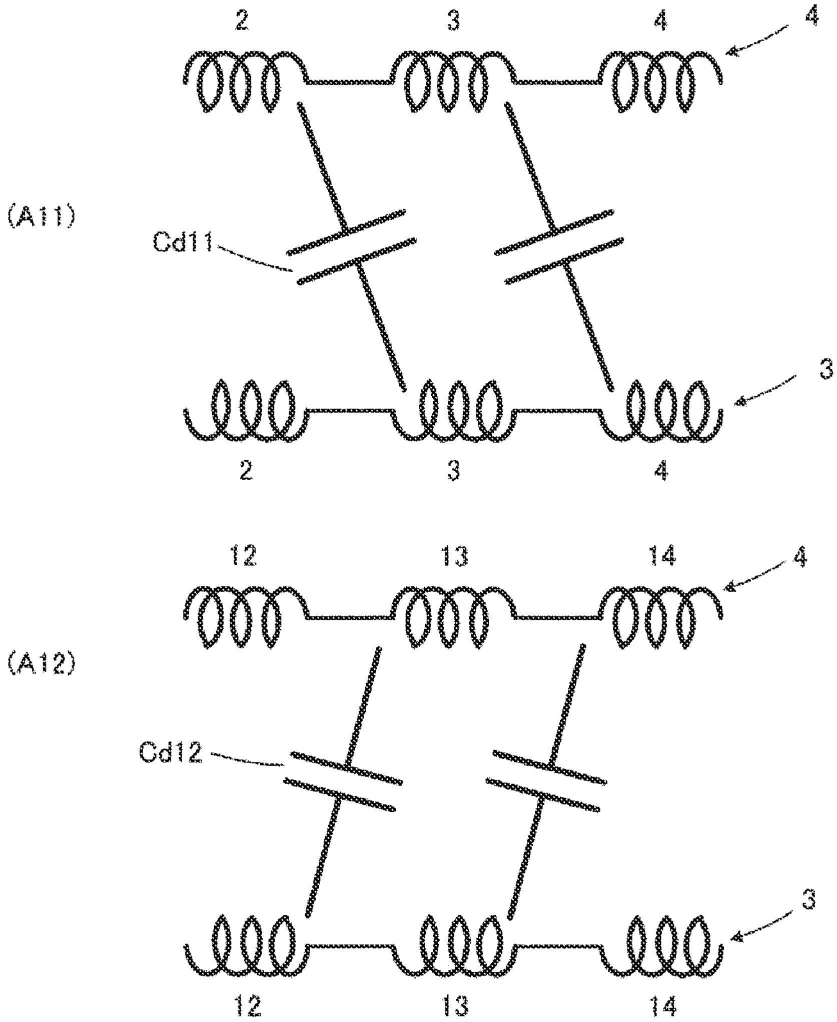
FIG. 10 is an equivalent circuit diagram for describing in more detail the diagonal capacitances generated between the first wire and the second wire illustrated in FIG. 9.

FIGS. 8 to 10 are diagrams for describing a common mode choke coil la according to the Second Embodiment of the present disclosure, where FIG. 8 corresponds to FIG. 2, FIG. 9 corresponds to FIG. 4, and FIG. 10 corresponds to FIG. 5. In FIGS. 8 to 10, elements corresponding to those illustrated in FIGS. 2 to 5 are denoted by the same reference symbols and repeated description thereof is omitted.

In the Second Embodiment as well, the first wire 3 and the second wire 4 are wound in a helical manner around the peripheral surface 5 of the winding core part 7 from the first end portion 9 on the side near the first flange part 11 to the second end portion 10 on the side near the second flange part 12 so as to have substantially the same number of turns, as illustrated in FIG. 8.

Furthermore, in the Second Embodiment as well, when the winding regions of the first wire 3 and the second wire 4 around the peripheral surface 5 of the winding core part 7 are classified on the basis of the winding states of the first wire 3 and the second wire 4, there are (1) a two-layer winding region A, and (2) a non-contact winding region B.

In this embodiment as well, one non-contact winding region B is positioned between the first flange part 11 and the two-layer winding region A in the axial direction 6 of the winding core part 7.

In the two-layer winding region A in this embodiment, one switching part C is provided in order to switch the positional relationship in the axial direction 6 between the turns of the first wire 3 and the second wire 4 by allowing the first wire 3 and the second wire 4 to cross each other. In the switching part C, gaps are provided between the turns of the wires 3 and 4 before and after the place where the first wire 3 and the second wire 4 cross each other. Switching of the positional relationship in the axial direction 6 between the turns of the first wire 3 and the second wire 4 will be described in detail later while referring to FIGS. 9 and 10.

Furthermore, similarly to the First Embodiment, the wire length of the first wire 3 is longer than the wire length of the second wire 4 in the non-contact winding region B.

In addition, similarly to the First Embodiment, as illustrated in FIG. 8, the coil length lg1 of the first wire 3 is longer than the coil length lg2 of the second wire 4 across the two-layer winding region A and the non-contact winding region B.

FIG. 9 illustrates an enlarged sectional view of parts of the winding states of the first wire 3 and the second wire 4 in two regions obtained by dividing the two-layer winding region A using the one switching part C, that is, a first region A11 and a second region A12. In addition, in FIG. 10, one turn of each of the first wire 3 and the second wire 4 illustrated in FIG. 9 is represented using one inductor symbol, and turns of the first wire 3 and the second wire 4 having the same ordinal turn number are illustrated as being vertically aligned.

In FIGS. 9 and 10, diagonal capacitances Cd11 and Cd12 are illustrated.

As illustrated in FIG. 9, in the first region A11 of the two-layer winding region A, a turn of the first wire 3 having a certain ordinal turn number and a turn of the second wire 4 having the same ordinal turn number are 0.5 turns apart from each other in the axial direction 6 of the winding core part 7.

Therefore, in the first region A11, the diagonal capacitance Cd11 is formed between an (n+1)th turn of the first wire 3 and an nth turn of the second wire 4, for example, between the third turn of the first wire 3 and the second turn of the second wire 4. Therefore, the diagonal capacitance Cd11 has a so-called "down and to the right" connection posture in the equivalent circuit diagram of FIG. 10 in which turns of the first wire 3 and the second wire 4 having the same ordinal turn number are illustrated as being vertically aligned. The diagonal capacitance Cd11 is quantified as "+1" following the above-described rules.

Next, in the second region A12, a turn of the first wire 3 having a certain ordinal turn number and a turn of the second wire 4 having the same ordinal turn number are 0.5 turns apart in the axial direction 6 of the winding core part 7, as illustrated in FIG. 9. However, in the second region A12, the direction in which the first wire 3 and the second wire 4 are shifted relative to each other is opposite to that in the first region A11.

In other words, in the second region A12, the diagonal capacitance Cd12 is formed between an nth turn of the first wire 3 and an (n+1)th turn of the second wire 4, for example, between the eleventh turn of the first wire 3 and the twelfth turn of the second wire 4. Therefore, the diagonal capacitance Cd12 has a so-called "up and to the right" connection posture in the equivalent circuit diagram of FIG. 10 in which turns of the first wire 3 and the second wire 4 having the same ordinal turn number are illustrated as being vertically aligned. The diagonal capacitance Cd12 is quantified as "4" following the above-described rules.

An overall diagonal capacitance of +1×N11 is generated in the first region A11 and an overall diagonal capacitance of −1×N12 is generated in the second region A12, where N11 is the number of turns of the second wire 4 located in the first region A11 and forming the second layer and N12 is the number of turns of the second wire 4 located in the second region A12 and forming the second layer.

Therefore, if the number of turns N11 is equal to the number of turns N12, the diagonal capacitances generated in the entire first region A11 are canceled out by the diagonal capacitances generated in the entire second region A12, and as a result, diagonal capacitances generated between the first wire 3 and the second wire 4 in the two-layer winding region A can be balanced across the entirety of the first wire 3 and second wire 4. Therefore, the effect of diagonal capacitances generated between the first wire 3 and the second wire 4 can be reduced and the mode conversion characteristic of the common mode choke coil la can be reduced.

Note that, in the Second Embodiment as well, in reality, stray capacitances that affect the mode conversion characteristic may include, in addition to the diagonal capacitances generated between the first wire 3 and the second wire 4 described above, stray capacitances generated between the first wire 3 and the second wire 4 in the switching part C, stray capacitances generated between the wires 3 and 4 and the terminal electrodes 13 to 16 (In the Second Embodiment as well, since the first terminal electrode 13 and the third terminal electrode 15 are relatively far from the two-layer winding region A, the stray capacitances in these places can be almost negligible), and stray capacitances generated between wiring lines on the mounting substrate and a reference ground plane when the common mode choke coil 1*a* is mounted. Therefore, considering these stray capacitances and so on and also considering the fact that there may be cases where total number of turns of the second wire 4 located in the two-layer winding region A and forming the second layer is not divisible by 2, the number of turns N11 described above does not have to be exactly equal to the number of turns N12 and a difference of around ±1 to ±3 is permitted.

In relation to this, in the embodiment illustrated in FIG. 8, the number of turns N11 of the second wire 4 located in the first region A11 and forming the second layer is 8 and the number of turns N12 of the second wire 4 located in the second region A12 and forming the second layer is also 8.

Next, the Second Embodiment also has a feature that the wire length of the first wire 3 is longer than the wire length of the second wire 4 in the non-contact winding region B.

Thus, the wire length of the first wire is longer than the wire length of the second wire in the non-contact winding region B in order to compensate for the amount by which the wire length of the first wire, which forms the first layer, is shorter than the wire length of the second wire, which forms the second layer, in the two-layer winding region A. As a result, the resistance component of the first wire 3 and the resistance component of the second wire 4 can be balanced.

Next, as illustrated in FIG. 8, the Second Embodiment also has a feature that the coil length lg1 of the first wire 3 is longer than the coil length lg2 of the second wire 4 across the two-layer winding region A and the non-contact winding region B.

Thus, the coil length lg1 of the first wire 3 is longer than the coil length lg2 of the second wire across the two-layer winding region A and the non-contact winding region B so as to compensate for the amount by which the inductance value L provided by the first wire 3 forming the first layer is larger than the inductance value L provided by the second wire 4 forming the second layer in the two-layer winding region A. As a result, the inductance component provided by the first wire 3 and the inductance component provided by the second wire 4 can be balanced.

According to the common mode choke coil 1*a* of the Second Embodiment as well, it was found that the total impedance including the resistance components and the inductance components in addition to the capacitance components can be balanced and therefore the mode conversion characteristic in a frequency range around 1 MHz can be effectively reduced.

Third Embodiment

Figure 11:
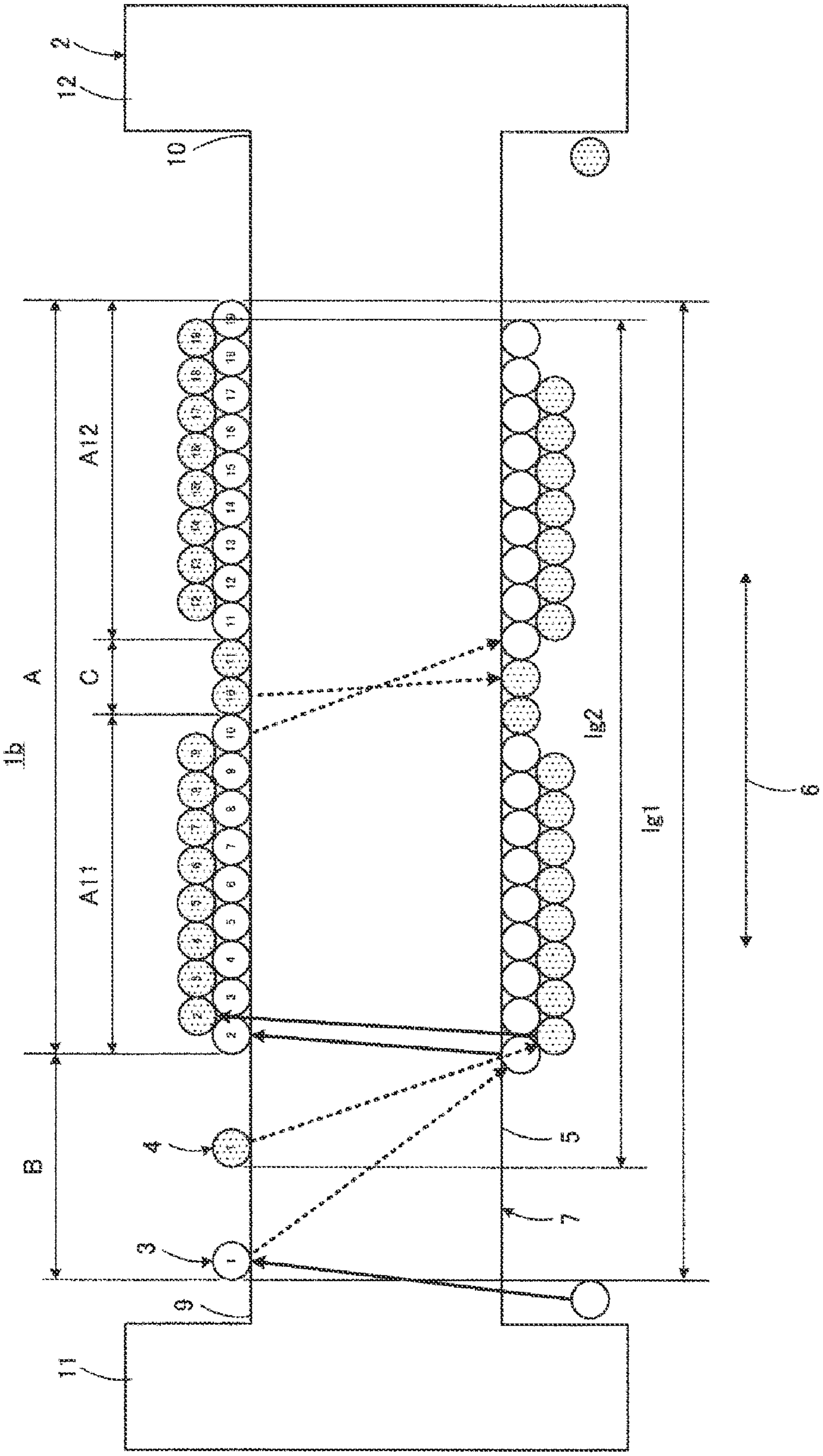
FIG. 11 is a diagram corresponding to FIG. 2 and schematically illustrates the winding states of a first wire and a second wire of a common mode choke coil according to a Third Embodiment of the present disclosure.

FIG. 11 is a diagram for describing a common mode choke coil 1*b* according to a Third Embodiment of the present disclosure and corresponds to FIG. 2 or 8. In FIG. 11, elements corresponding to those illustrated in FIG. 2 or 8 are denoted by the same reference symbols and repeated description thereof is omitted.

In the Second Embodiment, gaps are provided between the turns of the wires 3 and 4 before and after the place where the first wire 3 and the second wire 4 cross each other in the switching part C, whereas in the Third Embodiment, gaps are not provided between the turns of the wires 3 and 4 before and after the place where the first wire 3 and the second wire 4 cross each other in the switching part C. The rest of the Third Embodiment is identical to the Second Embodiment.

Fourth Embodiment

Figure 12:
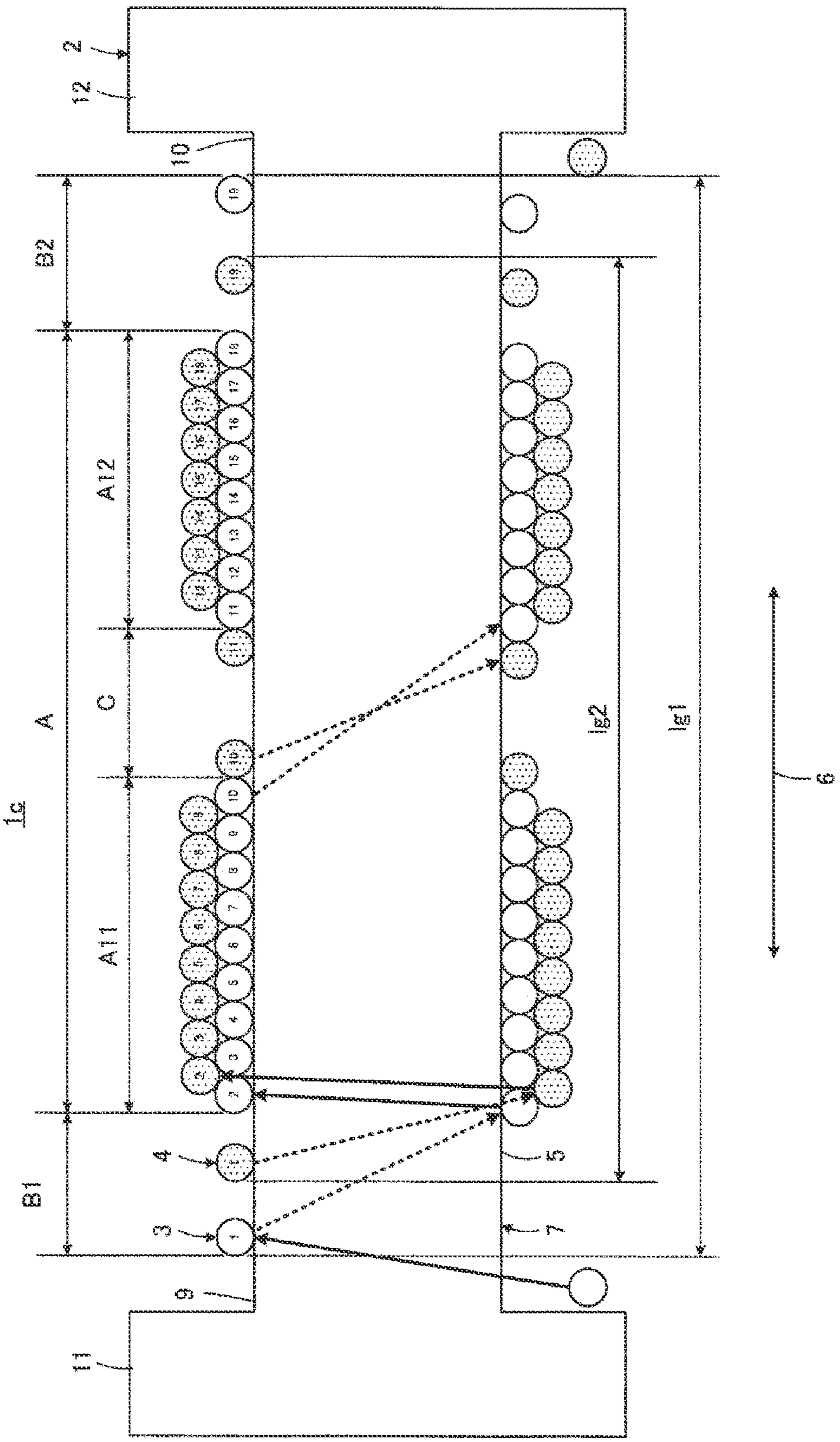
FIG. 12 is a diagram corresponding to FIG. 2 and schematically illustrates the winding states of a first wire and a second wire of a common mode choke coil according to a Fourth Embodiment of the present disclosure.

FIG. 12 is a diagram for describing a common mode choke coil 1*c* according to a Fourth Embodiment of the present disclosure and corresponds to FIG. 2, 8, or 11. In FIG. 12, elements corresponding to those illustrated in FIG. 2, 8, or 11 are denoted by the same reference symbols and repeated description thereof is omitted.

The Fourth Embodiment differs from the Second Embodiment in the following ways.

In the Second Embodiment, one non-contact winding region B is located between the first flange part 11 and the two-layer winding region A in the axial direction 6 of the winding core part 7, whereas in the Fourth Embodiment, two non-contact winding regions B1 and B2 are located between the first flange part 11 and the two-layer winding region A and between the second flange part 12 and the two-layer winding region A in the axial direction 6 of the winding core part 7. The rest of the embodiment is substantially the same as the Second Embodiment.

According to the Fourth Embodiment, wire length adjustment in order to balance resistance components and coil length adjustment in order to balance inductance components can be carried out in the two non-contact winding regions B1 and B2.

In the Fourth Embodiment, in the non-contact winding region B1, the endmost turn of the first wire 3 is located nearer the first flange part 11 than the endmost turn of the second wire 4 is, and in the non-contact winding region B2, the endmost turn of the first wire 3 is located nearer the second flange part 12 than is the endmost turn of the second wire 4.

Other Embodiments

Figure 13:
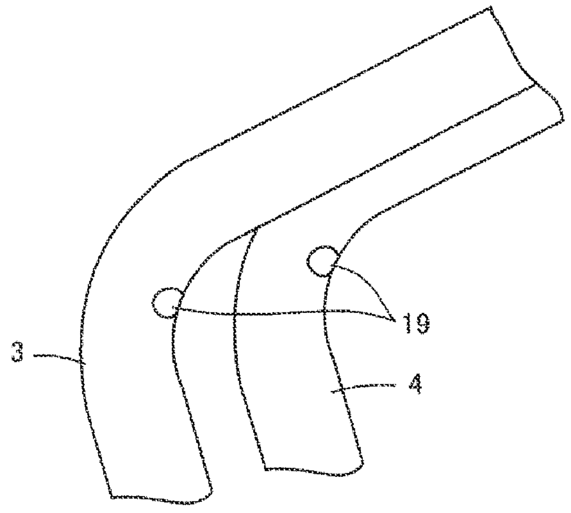
FIG. 13 is a perspective view for describing a state that may occur in wires in the embodiments of the present disclosure and illustrates in an enlarged manner parts of the first and second wires in a wound state from the side near the winding core part.

FIG. 13 illustrates a state that may occur in the wires 3 and 4 in all of the above-described embodiments.

For example, as illustrated in FIG. 1, the core 2 has a substantially quadrangular shaped cross section on the whole. Therefore, the winding core part 7 also has a substantially quadrangular shaped cross section. If the winding core part 7 has a polygonal columnar shape having a plurality of parallel ridge lines as represented by a quadrangular cross section, recesses 19 may be formed in parts of the first wire 3 and the second wire 4 that contact the ridge lines, as illustrated in FIG. 13, due to the tension applied while winding the wires 3 and 4. These recesses 19 provide increased contact areas with the winding core part 7 and therefore act so to make it less likely that shifting of the wires 3 and 4 on the peripheral surface 5 of the winding core part 7 will occur. This action is particularly effective for the parts of the wires 3 and 4 in the non-contact winding regions. The recesses 19 do not have to be formed at all the places where the wires 3 and 4 contact the ridge lines of the winding core part 7, and may instead be formed at only some of the places where the wires 3 and 4 contact the ridge lines. Therefore, the wires 3 and 4 will have the recesses 19 in at least some places where the wires 3 and 4 contact the ridge lines.

The present disclosure has been described above in relation to the illustrated embodiments, but the illustrated embodiments may be modified in various ways within the scope of the present disclosure.

Regarding the arrangement of the two-layer winding region and the non-contact winding region in the axial direction of the winding core part, any arrangement may be used so long as the condition "the non-contact winding region is located between the first flange part and the two-layer winding region in the axial direction of the winding core part" is satisfied. For example, a configuration in which another non-contact winding region is disposed between two two-layer winding regions is possible and there may be a region where there is no two-layer winding region and no non-contact winding region.

In addition, there may be three or more switching parts in the two-layer winding region. Furthermore, it is not necessary for the first wire and the second wire to contact each other over the entirety of one turn in the switching part and there may be a place where the first wire and the second wire do not contact each other within the turn.

Furthermore, regarding the numbers of turns of the wires wound around the peripheral surface of the winding core part, the illustrated numbers of turns are merely examples and the numbers of turns can be increased or decreased as needed.

In addition, each embodiment is an illustrative example and parts of the configurations described in different embodiments can be substituted for one another or combined with each other.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A common mode choke coil comprising:

a core containing a magnetic material and including a winding core part that has a peripheral surface and extends in an axial direction parallel to the peripheral surface, and a first flange part and a second flange part that are respectively at a first end portion and a second end portion of the winding core part on opposite sides from each other in the axial direction of the winding core part;

a first terminal electrode and a third terminal electrode that are on the first flange part;

a second terminal electrode and a fourth terminal electrode that are on the second flange part;

a first wire that is wound in a helical manner around the peripheral surface of the winding core part and is connected to the first terminal electrode and the second terminal electrode; and a second wire that is wound in a helical manner around the peripheral surface of the winding core part in a direction identical to a winding direction of the first wire and is connected to the third terminal electrode and the fourth terminal electrode, wherein the first wire and the second wire include wire-shaped central conductors composed of identical conductive materials, when winding regions of the first wire and the second wire around the peripheral surface of the winding core part are classified on the basis of winding states of the first wire and the second wire, there are a two-layer winding region that includes a two-layer wound part consisting of a first layer in which the first wire is wound around the peripheral surface of the winding core part and a second layer in which the second wire is positioned outside the first layer while fitting into recesses formed between adjacent turns of the first wire, and a non-contact winding region in which the first wire and the second wire are wound so as to not contact each other, the non-contact winding region is located between the first flange part and the two-layer winding region in the axial direction of the winding core part, the two-layer winding region includes a switching part that is for switching a positional relationship in the axial direction between turns of the first wire and the second wire in the two-layer winding region and is a part in which the first wire and the second wire cross each other, in the non-contact winding region, a wire length of the first wire is longer than a wire length of the second wire, and across the two-layer winding region and the non-contact winding region, a coil length of the first wire, which is a length, measured in the axial direction, of the first wire wound around the peripheral surface of the winding core part, is longer than a coil length of the second wire, which is a length, measured in the axial direction, of the second wire wound around the peripheral surface of the winding core part.

2. The common mode choke coil according to claim 1, wherein the first wire and the second wire each include an electrically insulating coating that covers a peripheral surface of the wire-shaped central conductor, and the central conductor of the first wire and the central conductor of the second wire have identical diameters.

3. The common mode choke coil according to claim 2, wherein a wire length of the first wire and a wire length of the second wire are identical through the two-layer winding region and the non-contact winding region.

4. The common mode choke coil according to claim 2, wherein in the non-contact winding region, an endmost turn of the first wire is located nearer the first flange part than is an endmost turn of the second wire.

5. The common mode choke coil according to claim 2, wherein the second wire contacts the peripheral surface of the winding core part in part of the two-layer winding region.

6. The common mode choke coil according to claim 2, wherein the non-contact winding region is located between the first flange part and the two-layer winding region and between the second flange part and the two-layer winding region, in the axial direction of the winding core part.

7. The common mode choke coil according to claim 2, wherein the winding core part has a quadrangular columnar shape having a plurality of parallel ridge lines, and the first wire and the second wire have recesses in at least some places where the first wire and the second wire contact the ridge lines.

8. The common mode choke coil according to claim 1, wherein a wire length of the first wire and a wire length of the second wire are identical through the two-layer winding region and the non-contact winding region.

9. The common mode choke coil according to claim 8, wherein in the non-contact winding region, an endmost turn of the first wire is located nearer the first flange part than is an endmost turn of the second wire.

10. The common mode choke coil according to claim 8, wherein the second wire contacts the peripheral surface of the winding core part in part of the two-layer winding region.

11. The common mode choke coil according to claim 8, wherein the non-contact winding region is located between the first flange part and the two-layer winding region and between the second flange part and the two-layer winding region, in the axial direction of the winding core part.

12. The common mode choke coil according to claim 8, wherein the winding core part has a quadrangular columnar shape having a plurality of parallel ridge lines, and the first wire and the second wire have recesses in at least some places where the first wire and the second wire contact the ridge lines.

13. The common mode choke coil according to claim 1, wherein in the non-contact winding region, an endmost turn of the first wire is located nearer the first flange part than is an endmost turn of the second wire.

14. The common mode choke coil according to claim 13, wherein the second wire contacts the peripheral surface of the winding core part in part of the two-layer winding region.

15. The common mode choke coil according to claim 13, wherein the non-contact winding region is located between the first flange part and the two-layer winding region and between the second flange part and the two-layer winding region, in the axial direction of the winding core part.

16. The common mode choke coil according to claim 13, wherein the winding core part has a quadrangular columnar shape having a plurality of parallel ridge lines, and the first wire and the second wire have recesses in at least some places where the first wire and the second wire contact the ridge lines.

17. The common mode choke coil according to claim 1, wherein the second wire contacts the peripheral surface of the winding core part in part of the two-layer winding region.

18. The common mode choke coil according to claim 17, wherein he non-contact winding region is located between the first flange part and the two-layer winding region and between the second flange part and the two-layer winding region, in the axial direction of the winding core part.

19. The common mode choke coil according to claim 1, wherein the non-contact winding region is located between the first flange part and the two-layer winding region and between the second flange part and the two-layer winding region, in the axial direction of the winding core part.

20. The common mode choke coil according to claim 1, wherein the winding core part has a quadrangular columnar shape having a plurality of parallel ridge lines, and the first wire and the second wire have recesses in at least some places where the first wire and the second wire contact the ridge lines.

* * * * *